UNITED STATES PATENT OFFICE.

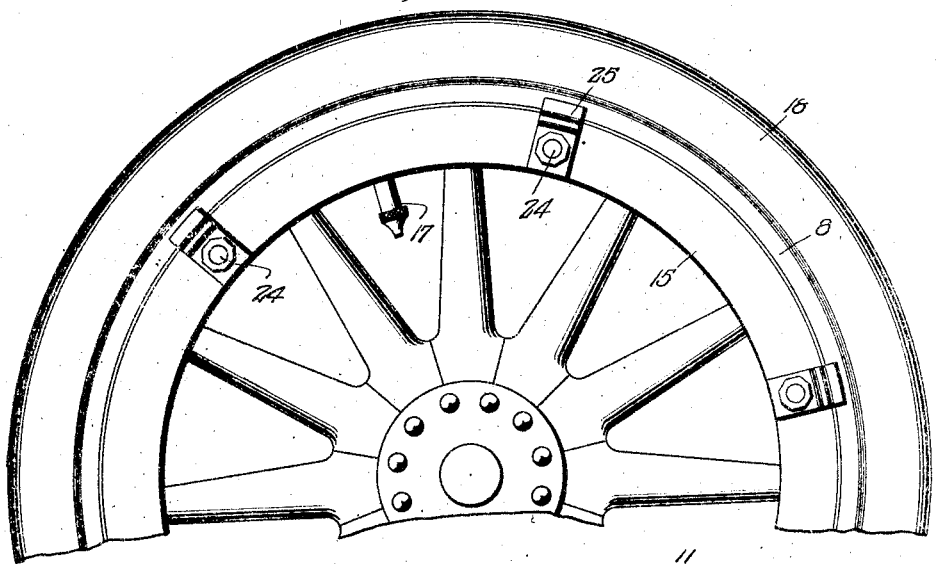
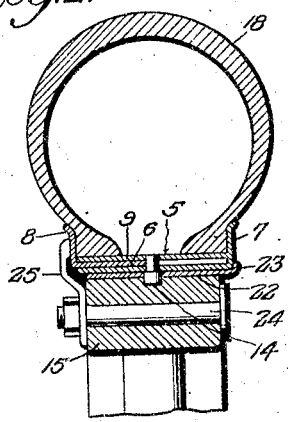
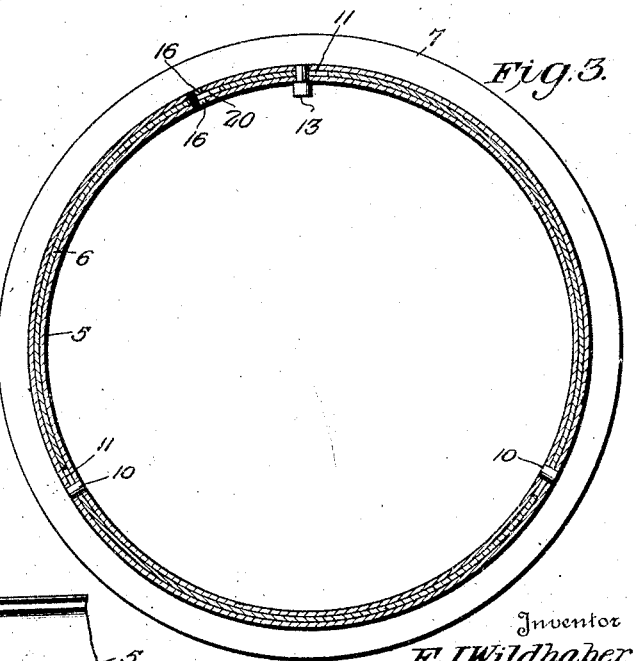
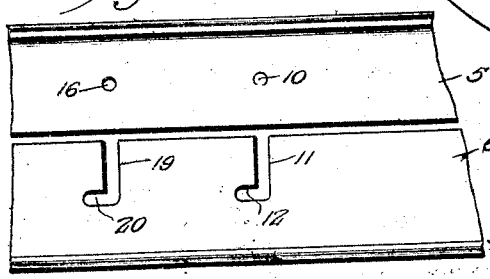

FRED WILDHABER AND AL L. WARREN, OF NOWATA, OKLAHOMA.

DEMOUNTABLE WHEEL-RIM.

1,389,470.   Specification of Letters Patent.   Patented Aug. 30, 1921.

Application filed November 27, 1920. Serial No. 426,769.

*To all whom it may concern:*

Be it known that we, FRED WILDHABER and AL L. WARREN, citizens of the United States, residing at Nowata, in the county of Nowata and State of Oklahoma, have invented certain new and useful Improvements in a Demountable Wheel-Rim, of which the following is a specification.

This invention relates to improvements in demountable wheel rims for supporting pneumatic tires and the invention has for its object to provide a rim consisting essentially of companion rim sections capable of swift and convenient separation to facilitate application or removal of a tire casing, in combination with simple and effective devices for maintaining the rim sections in assembled relation.

A further object is the provision of an extension on one of the rim section retaining devices which is seated in a recess formed in the wheel felly and prevents movements of the demountable rim bodily relative to the wheel.

A further object is the utilization of the pneumatic tire valve stem in maintaining the rim sections in assembled relation, the extension of the rim section retaining device being located in proximity to the stem of the tire valve to permit the removal of the rim from the wheel.

With these and other objects in view the invention consists in certain novel features of construction as hereinafter shown and described, and specifically pointed out in the claim.

In the accompanying drawing:

Figure 1 represents a fragmentary side elevation of a vehicle wheel with the demountable rim applied to use.

Fig. 2 represents an enlarged sectional view of the felly, rim and tire in the plane of one of the retaining devices supporting the rim sections and maintaining the latter in assembled relation.

Fig. 3 represents a diametrical sectional view through the rim removed from the wheel.

Fig. 4 represents a fragmentary plan view of contiguous portions of the companion rim sections.

Referring to the drawing in detail, wherein similar reference numerals designate corresponding parts throughout the several views, the numerals 5 and 6 indicate the interfitting rim sections which are provided at the lateral longitudinal edges with a preferred type of tire supporting flanges 7 and 8 according to the type of tire in connection with which the rim is to be used. The rim section 5 consists of a body of considerably greater thickness than the body of the section 6 and in which is formed a laterally opening slot 9 of a width and depth to accommodate the annular body of the rim section 6. This telescopic interfitting of the rim sections permits of convenient separation thereof as in removing or applying a tire casing while the latter, as will be understood, is mounted directly upon the rim section 5 and confined between the supporting flanges 7 and 8.

A plurality of radially disposed pins 10 are rigidly and permanently secured in the annular body portion of the rim section 5 and extend across the slot 9 thereof. The pins 10 are movable in slots 11 and formed in the rim section 6 and the extremities of the slots 11 are directed angularly to provide shoulders 12 disposed longitudinally of the rim section 6 and adapted to engage behind the pins 10 so as to effectively resist lateral separation of the rim sections. The several pins 10, with one exception, terminate flush with the inner and outer faces of the body of the rim section 5, whereas this one pin is extended inwardly a distance beyond the inner face of the rim part 5 as indicated at 13 and is seated in a recess 14 formed in the wheel felly 15 to prevent relative movement of the rim part 5 and the vehicle wheel.

A portion of the rim section 5 adjacent the extended terminal 13 of the pins 10 is provided with an aperture 16 to accommodate the valve stem 17 of a pneumatic tire 18 supported in the demountable rim and the underlying portion of the other rim section 6 is formed with an L-shaped slot 19 to accommodate the tire valve 17, the shoulder 20 of the slot 19 coacting with the tire valve 17, upon rotary movement of the respective rim sections, to assist the pins 10 in resisting lateral separation of the rim sections.

The felly ring 22 is provided on one side edge with a laterally directed flange 23 forming an abutment for the rim section 5 and bolts 24 mounted transversely through the felly are fitted with cleats 25 to maintain the demountable rim structure in position on the ring 22.

In use, the tire 18 is supported upon the demountable rim consisting of the sections 5 and 6 and is confined between the side flanges 7 and 8 thereof, the entire rim being effectively maintained in operative position upon the wheel and confined between the flange 23 of the felly ring and the cleats 25. When the respective sections of the rim are properly asembled, the pins 10 fitting behind the shoulders 12, they are inseparably interlocked against relative lateral movement. However, when it is desired to remove or apply a tire, the respective sections 5 and 6 are given relative rotary movement, effecting the disengagement of the pins 10 from the shoulders 12 and permitting the lateral movement of said pins through the slots 11. The lug or extension 13 of one of the pins 10 engaging in the recess in the ring 22 and felly 15 effectively prevent rotary movement of the wheel felly and rim when the latter is operatively applied to the wheel. It is very evident that by providing the shoulder 20 for abutment with the tire valve 17 the latter is utilized in maintaining the sections of the rim in assembled condition.

What we claim is:

In a demountable rim, a pair of laterally separable rim sections, one of said sections having a portion formed to provide a laterally opening circumferentially extending channel adapted to receive a complemental portion of the other of said sections, locking pins carried by the channeled rim section and arranged to bridge the channel thereof at spaced intervals around the same, bayonet slots formed in the other said sections and adapted for engagement with the said locking pins, and a headed end on one of the locking pins extending inwardly of the rim and adapted to act as a driver.

In testimony whereof, we affix our signatures hereto.

FRED WILDHABER.
AL L. WARREN.